United States Patent

Wang

(10) Patent No.: US 12,500,505 B2
(45) Date of Patent: Dec. 16, 2025

(54) POWER SUPPLY SYSTEMS AND POWER SUPPLY METHODS

(71) Applicant: Ace Power and Technology Co., Ltd, Shanghai (CN)

(72) Inventor: Yuetian Wang, Shanghai (CN)

(73) Assignee: Ace Power and Technology Co., Ltd, Shanghai (CN)

( * ) Notice: Subject to any disclaimer, the term of this patent is extended or adjusted under 35 U.S.C. 154(b) by 250 days.

(21) Appl. No.: 18/210,162

(22) Filed: Jun. 15, 2023

(65) Prior Publication Data

US 2023/0412063 A1    Dec. 21, 2023

(30) Foreign Application Priority Data

Jun. 17, 2022   (CN) .......................... 202210691937.2

(51) Int. Cl.
| | |
|---|---|
| *H02M 1/00* | (2006.01) |
| *H02J 7/06* | (2006.01) |
| *H02M 1/32* | (2007.01) |
| *H02M 3/158* | (2006.01) |
| *H02M 7/219* | (2006.01) |

(52) U.S. Cl.
CPC ............... *H02M 1/007* (2021.05); *H02J 7/06* (2013.01); *H02M 1/325* (2021.05); *H02M 3/1582* (2013.01); *H02M 7/219* (2013.01)

(58) Field of Classification Search
CPC .... H02M 1/007; H02M 1/325; H02M 3/1582; H02M 7/219; H02J 7/06
USPC .......................................................... 323/266
See application file for complete search history.

(56) References Cited

U.S. PATENT DOCUMENTS

| | | | | | |
|---|---|---|---|---|---|
| 5,477,091 | A | * | 12/1995 | Fiorina ............. | H02J 13/00002 307/26 |
| 8,193,660 | B2 | * | 6/2012 | Rockenfeller .......... | H02J 9/062 307/64 |
| 2015/0180232 | A1 | * | 6/2015 | Mino ........................ | H02J 7/35 307/66 |

(Continued)

FOREIGN PATENT DOCUMENTS

| | | |
|---|---|---|
| CN | 109888805 | 6/2019 |
| CN | 210092957 | 2/2020 |

(Continued)

OTHER PUBLICATIONS

Notification of Office Action and Search Report Dated Jun. 26, 2025 From the State Intellectual Property Office of the People's Republic of China Re. Application No. 202210691937.2 and Its Translation Into English (22 Pages).

*Primary Examiner* — Yemane Mehari

(57) ABSTRACT

A power supply system includes a power input terminal, a rectifying circuit and a power output terminal coupled in sequence. The rectifying circuit includes an AC-DC conversion circuit and a DC-DC conversion circuit coupled via a first DC bus. The power supply system further includes at least one energy storage circuit coupled to the first DC bus. When AC power is input to the power input terminal, the AC-DC conversion circuit can convert the AC power into first DC power and input the first DC power to the energy storage circuit so that the energy storage circuit is charged. When the AC power fails to be input to the power input terminal, the energy storage circuit can discharge by outputting second DC power to the DC-DC conversion circuit.

18 Claims, 3 Drawing Sheets

(56) References Cited

U.S. PATENT DOCUMENTS

| | | | | |
|---|---|---|---|---|
| 2017/0085122 A1* | 3/2017 | Nasiri | .................... | A61B 6/56 |
| 2018/0116070 A1* | 4/2018 | Broadbent | ................ | G06F 1/30 |
| 2018/0152115 A1* | 5/2018 | Yan | .................... | H02M 3/158 |
| 2022/0385204 A1* | 12/2022 | Nakahara | ................ | H02M 7/06 |
| 2023/0411979 A1* | 12/2023 | Wang | .................... | H02J 7/35 |

FOREIGN PATENT DOCUMENTS

| | | |
|---|---|---|
| CN | 111446768 | 7/2020 |
| CN | 213402553 | 6/2021 |

\* cited by examiner

POWER SUPPLY SYSTEMS AND POWER SUPPLY METHODS

CROSS-REFERENCE TO RELATED APPLICATION

This application claims the benefit of priority of Chinese Patent Application No. 202210691937.2, filed on Jun. 17, 2022, the disclosure of which is incorporated herein by reference in its entirety.

TECHNICAL FIELD

The present application relates to power supply technologies, and in particular, to power supply systems and power supply methods.

BACKGROUND

An uninterruptible power supply is required for supplying power in a data machine room. In the related art, a direct current (DC) system and a medium-voltage 10 kVac DC/DC system used. An energy storage battery in each of the medium voltage DC/DC system and the DC system is directly connected in parallel to an output terminal of the power supply system to serve as a backup. A range of a voltage output by the power supply system is restricted by a voltage of the energy storage battery, and a power distribution cable or the like at a downstream of the power supply system may be configured only according to a lowest battery voltage of the energy storage battery. Therefore, there are many limitations in choosing a proper cable at the downstream of the power supply system.

SUMMARY

In view of the above, an embodiment of the present application provides a power supply system including: a power input terminal, a rectifying circuit, and a power output terminal coupled in sequence,
the rectifying circuit includes an alternating current (AC)/direct current (DC) conversion unit and a DC-DC conversion circuit coupled to the AC-DC conversion circuit via a first DC bus, and the power supply system further includes at least one energy storage circuit coupled to the first DC bus;
the AC-DC conversion circuit is configured to, when AC power is input to the power input terminal, convert the AC power into first DC power and input the first DC power to the energy storage circuit for charging the energy storage circuit; and
the energy storage circuit is configured to, when the AC power fails to be input to the power input terminal, discharge by outputting second DC power to the DC-DC conversion circuit.

An embodiment of the present application further provides a power supply method applied to the power supply system including a power input terminal, a rectifying circuit, and a power output terminal coupled in sequence,
the rectifying circuit includes an AC-DC conversion circuit and a DC-DC conversion circuit coupled to the AC-DC conversion circuit via a first DC bus; and
the power supply system further includes at least one energy storage circuit coupled to the first DC bus,
the power supply method including one of:
when AC power is input to the power input terminal, the AC-DC conversion circuit converting the AC power into first DC power and inputting the first DC power to the energy storage circuit for charging the energy storage circuit; and
when the AC power fails to be input to the power input terminal, the energy storage circuit discharging by outputting second DC power to the DC-DC conversion circuit.

DETAILED DESCRIPTION

Some embodiments of the present application will be described in detail below in conjunction with the drawings. The embodiments are provided for illustrative purposes only, not intended to limit the scope of the present application.

In the description of the present application, it is to be understood that the term "first", "second" are for illustrative purposes only and are not to be construed as indicating or imposing a relative importance or implicitly indicating the number of technical features indicated. Thus, a feature that limited by "first", "second", or the like may expressly or implicitly include one or more of the features. In the description of the present application, the meaning of "plural/plurality" is two or more, unless otherwise specifically defined.

In the present application, the term "exemplary" is used to mean "as an example, illustration, or illustration." Any embodiment described herein as "exemplary" is not necessarily to be construed as preferred or advantageous over other embodiments. To enable any person skilled in the art to make and use the present application, the following description is given. In the following description, details are set forth for purposes of explanation. It will be appreciated by those of ordinary skill in the art that the present application may be practiced without these specific details. In other examples, well-known structures and procedures will not be set forth in detail so as not to obscure the description of the present application with unnecessary detail. Thus, the present application is not intended to be limited to the shown embodiments, but is to be accorded the broadest scope consistent with the principles and features disclosed herein.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
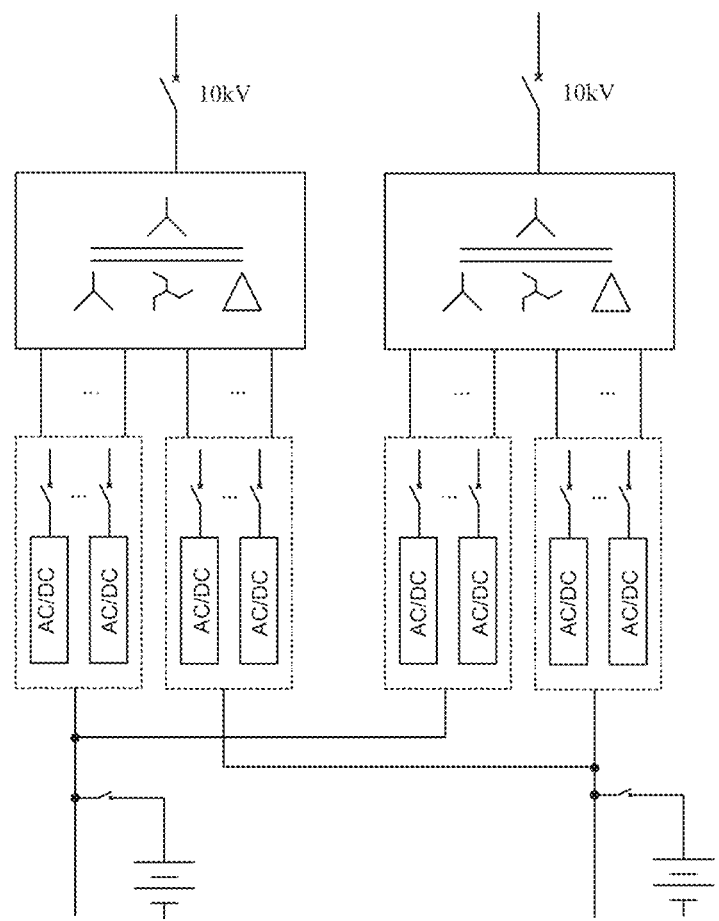
FIG. 1 is a block diagram of a conventional power supply system.

An uninterruptible power supply is required for supplying power in a data machine room. In the related art, a direct current (DC) system is used. The DC system outputs a DC voltage, and thus parallel connection in the DC system is simple and reliable and a battery is directly connected in parallel to two nodes of a DC bus as a backup. Two communication industry standards «YD/T2378-2020 Communications 240V DC Power Supply System» and «YD/T3089 Communications 336V DC Power Supply System» have been established. In recent years, a medium-voltage (where V is a voltage unit, and AC is alternating current (AC)) DC/DC system has been developed. As shown in FIG. 1, the medium-voltage 10 kVac DC/DC system includes a 10 kVac power distribution system, a phase-shifting transformer, an AC/DC power supply, an output power distribution circuit, or the like. The medium-voltage DC/DC system directly reduces the medium-voltage 10 kVac to 240 Vdc or 336 Vdc and a battery is directly connected in parallel to two nodes of a DC bus as a backup.

Energy storage batteries in both the medium voltage DC/DC system and DC system are directly connected in parallel to an output terminal of the power supply system to serve as a backup. Therefore, an output voltage of the power supply system is required to match a voltage range of the energy storage battery. For example, for a 240V uninterruptible power supply system, the voltage range of the energy storage battery thereof is 210 Vdc to 285 Vdc. For a 336V uninterruptible power supply system, the voltage range of the energy storage battery thereof is 294 Vdc to 400 Vdc. Since power consumption devices at the downstream such as a circuit breaker, a cable, a server power supply, or the like need to meet the voltage range, the circuit breakers and cables in the power supply system need to select the lowest operation voltage as an operation voltage. That is, the lowest operation voltage of the 240V uninterruptible power supply system is 210 Vdc, and the 336V lowest operating voltage of the uninterruptible power supply system is 294 Vdc.

According to the circuit principle, for the same system power, the lower the voltage output by the output terminal is, the larger the current is, the larger the switch capacity is, and the thicker the cable is. If the configuration of the energy storage battery in the prior art is used, the cost of the DC power distribution system at the downstream of the power supply system is higher. Meanwhile, the energy storage battery is provided on the output terminal of the power supply system, the range of the voltage output by the power supply system is restricted by the voltage of the energy storage battery, and the power distribution cable at the downstream of the power supply system may be designed only according to the lowest battery voltage of the energy storage battery. In addition, since the energy storage battery is directly connected in parallel to the output terminal of the power supply system, and the load to be supplied with the power is also connected in parallel to the output terminal of the power supply system. When the load changes, the energy storage battery might be discharged to the load and the energy storage battery is charged by the power supply system, which increases the times of charging and discharging of the energy storage battery, resulting in greater losses and easily shortening the battery life of the energy storage battery.

In view of the above, an embodiment of the present application provides a power supply system and a power supply method, which are described in detail below.

Figure 2:
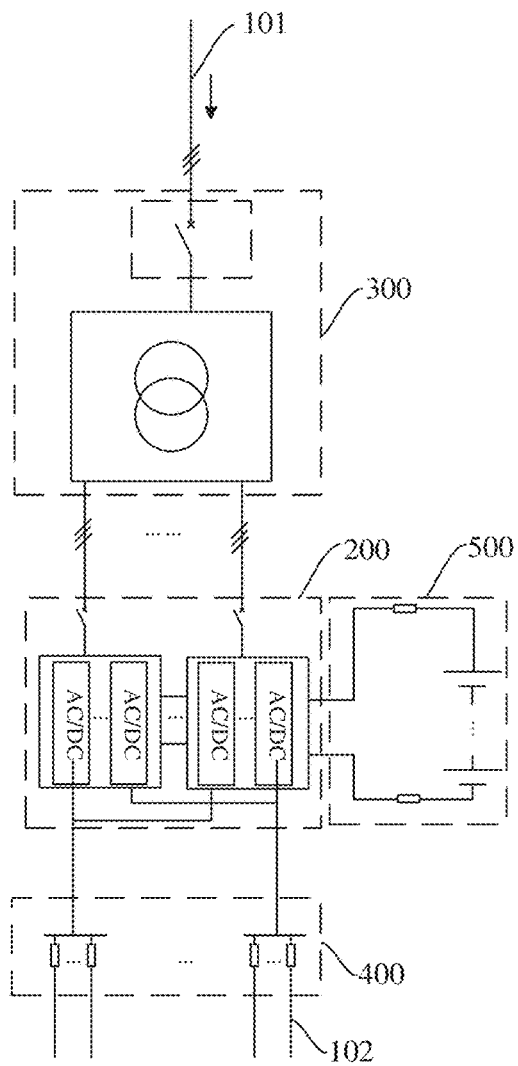
FIG. 2 is a schematic block diagram of a power supply system according to an embodiment of the present application.
Figure 3:
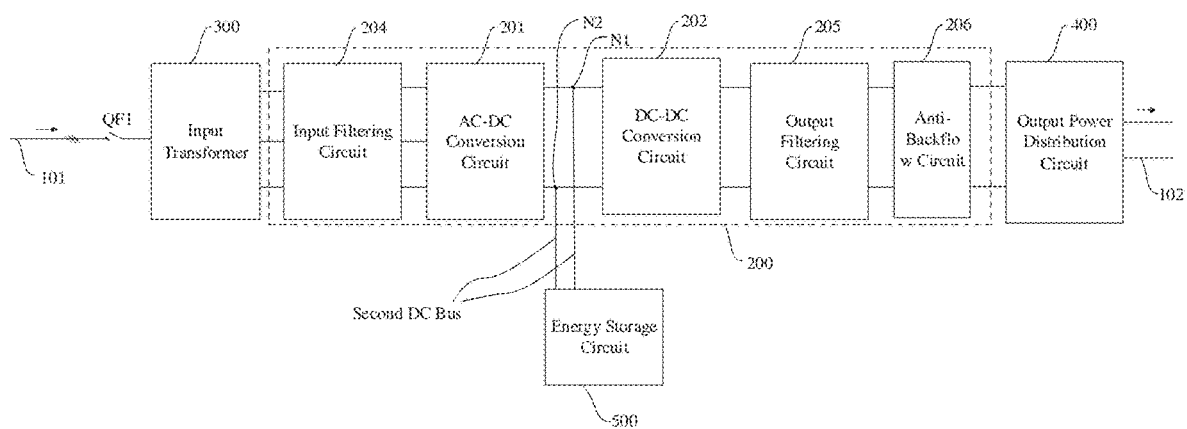
FIG. 3 is a schematic block diagram of a power supply system according to an embodiment of the present application.

FIG. 2 and FIG. 3 are schematic block diagrams of an embodiment of a power supply system according to an embodiment of the present application.

The power supply system of the present application may include a 10 k Vac DC/DC power supply system including a power input terminal 101, a rectifying circuit 200, and a power output terminal 102 coupled in sequence.

Specifically, the power input terminal 101 is connected to a mains supply for inputting three-phase AC power to the power supply system. In an embodiment, the three-phase AC power inputted from the power input terminal 101 is referred to as AC power, and the AC power is converted into DC power having a preset voltage value through the rectifying circuit 200, and the DC power is outputted to the power output terminal 102 to supply power to a load externally connected to the power supply system through the power output terminal 102.

In the present embodiment, the rectifying circuit 200 includes an AC-DC conversion circuit 201 and a DC-DC conversion circuit 202. The AC-DC conversion circuit 201 and the DC-DC conversion circuit 202 are coupled via a first DC bus. The power supply system further includes at least one energy storage circuit 500. The energy storage circuit 500 is coupled to a first node N1 and a second node N2 of the first DC bus as shown in FIG. 3.

The AC-DC conversion circuit 201 converts AC power into first DC power and transmits the first DC power to the energy storage circuit 500 so that the energy storage circuit 500 is charged, upon the AC power is input to the power input terminal 101.

The energy storage circuit 500 is discharged and outputs second DC power to the DC-DC conversion circuit 202, upon the AC power input to the power input terminal 101 is stopped.

Figure 4:
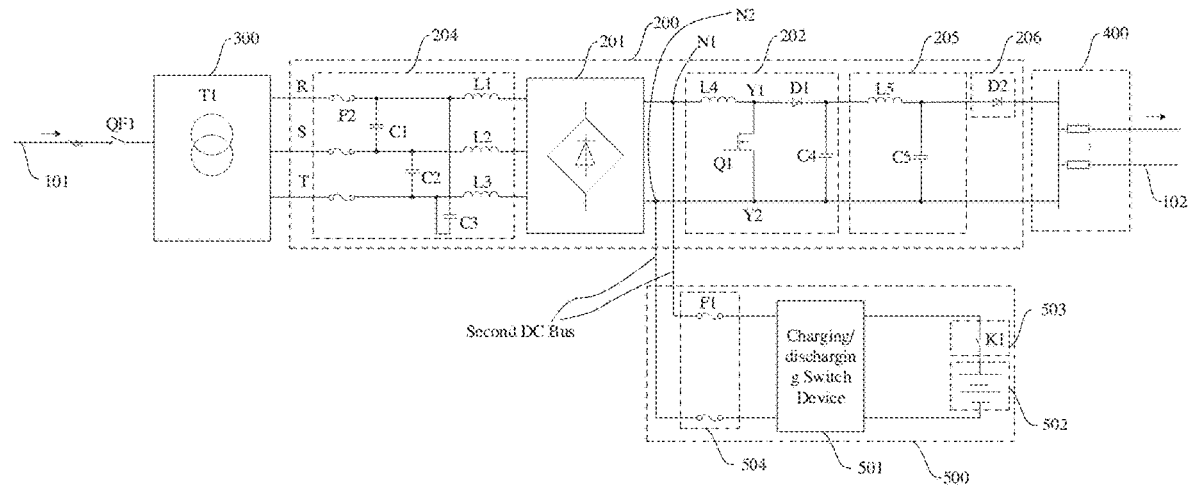
FIG. 4 is a schematic block diagram of a power supply system according to an embodiment of the present application.
Figure 5:
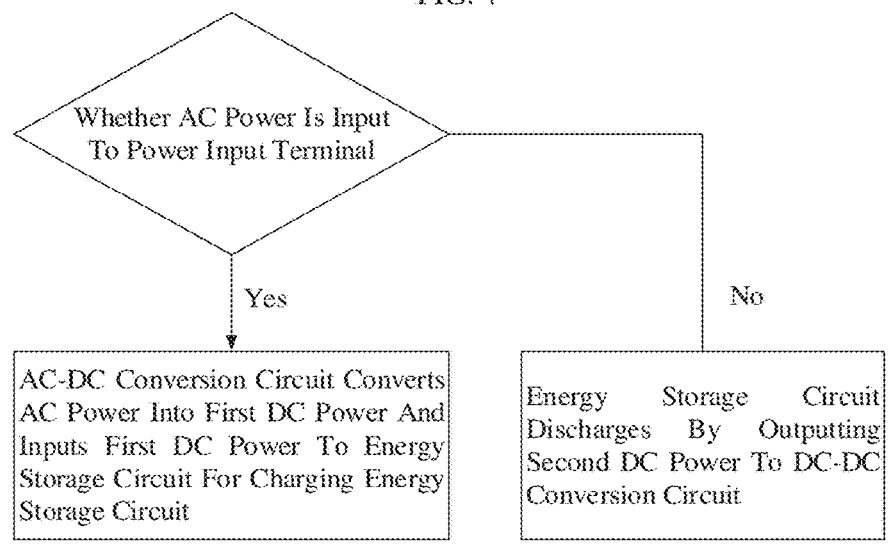
FIG. 5 is a flowchart of a power supply method according to an embodiment of the present application.

In an embodiment, as shown in FIG. 4, the AC-DC conversion circuit 201 includes a full-bridge rectifying circuit bridge through which the AC power input to the rectifying circuit 200 is rectified to obtain DC power. The AC-DC conversion circuit 201 may include any devices capable of realizing a rectification function, which is not limited in the present embodiment.

In an embodiment, the DC-DC conversion circuit 202 includes a fourth inductor L4, a first diode D1, a power switch transistor Q1, and a fourth capacitor C4. The fourth inductor L4 is coupled in series with a positive electrode of the first diode D1 and coupled to a first output node Y1 of the AC-DC conversion circuit 201. The positive electrode of the first diode D1 is coupled to a second output node Y2 of the AC-DC conversion circuit 201 via the power switch transistor Q1. Both terminals of the fourth capacitor C4 are coupled to a negative electrode of the first diode D1 and the second output node Y2 of the AC-DC conversion circuit 201, respectively. The fourth inductor L4 is an energy storage inductor. The fourth capacitor C4 is a filter capacitor. The types and parameters of the fourth inductor L4, the first diode D1, the power switch transistor Q1, and the fourth capacitor C4 in this embodiment may be adjusted according to actual conditions, and are not limited herein.

In the application process, when the power switch transistor Q1 is turned on, the current flowing through the fourth inductor L4 increases. When the power switch transistor Q1 is turned off, the fourth capacitor C4 is charged with the current stored in the fourth inductor L4 through the first diode D1. When the voltage across the fourth capacitor C4 reaches the target voltage value, the AC-DC conversion circuit 201 and the power output terminal 102 are turned on.

When the AC power is input to the power input terminal 101 and the power switch transistor Q1 is turned on, the AC power is converted into the first DC power by the AC-DC conversion circuit 201. The first DC power is converted into first DC power having a target voltage value through the DC-DC conversion circuit 202, and the first DC power having the target voltage value is output to the power output terminal 102, while the first DC power is input to the energy storage circuit 500 so that the energy storage circuit 500 is charged.

When the AC power input to the power input terminal 101 is stopped and the power switch transistor Q1 is turned on, the energy storage circuit 500 is discharged and outputs second DC power to the DC-DC conversion circuit 202, and the DC-DC conversion circuit 202 converts the second DC power into second DC power having a target voltage value, and outputs the second DC power having the target voltage value to the power output terminal 102.

Based on the above circuit principle, it can be seen that the DC power transmitted to the power output terminal 102 may be the first DC power having the target voltage value converted by the DC-DC conversion circuit 202, or may be the second DC power having the target voltage value converted by the DC-DC conversion circuit 202. That is, the voltage of the DC power output from the power output terminal 102 is converted by the DC-DC conversion circuit 202 regardless of whether the power is supplied by inputting the AC power from the power input terminal or by the discharge of the energy storage battery. Therefore, the voltage range of the DC power output from the power output terminal 102 is no longer limited to the voltage range of the second DC power output from the energy storage circuit 500.

In a conventional power supply system, an energy storage battery is generally connected in parallel to a DC bus at an output terminal of the power supply system, so that a cable at the downstream of the power supply system must match the energy storage battery, thereby increasing the cost of the power supply system. Meanwhile, the load to be supplied with the power is also connected in parallel to the output terminal of the power supply system, and thus when the load changes, the energy storage battery might be discharged to the load and the energy storage battery is charged by the power supply system, which increases the times of charging and discharging of the energy storage battery, resulting in greater losses and easily shortening the battery life of the energy storage battery.

The energy storage circuit 500 according to an embodiment of the present application is not connected in parallel to the output terminal, and the energy storage circuit 500 of the present application is coupled to the first node N1 and the second node N2 of the first DC bus via the second DC bus. Therefore, the range of the voltage output by the power supply system may be narrower. For example, for the power supply system of 240V, the range of the voltage output by the power supply system may be 240 Vdc to 285 Vdc. For the power supply system of 336V, the range of the voltage output by the power supply system may be 360 Vdc to 400 Vdc.

Therefore, the range of the voltage output by the power output terminal 102 of the power supply system according to an embodiment of the present application is limited to the range of the voltage provided by the energy storage battery 502. That is, the voltage output by the power output terminal 102 according to an embodiment of the present application may be higher, and the current flowing through it may be smaller. The smaller the corresponding switch capacity used, the thinner the cable at the output terminal of the power supply system. Therefore, the devices such as the circuit breaker QF1, the cable, or the server power supply at the downstream of the power supply system may be variously provided, so that the cost of the power supply system may be reduced. Meanwhile, the energy storage circuit 500 is arranged as above in an embodiment of the present application, to effectively avoid frequent charging and discharging of the energy storage circuit 500, thereby reducing the loss of the energy storage circuit 500 and making the service life of the energy storage circuit 500 longer.

In an embodiment, as shown in FIGS. 3 and 4, the energy storage circuit 500 includes:
 a charging/discharging switch device 501 coupled to the first DC bus via a second DC bus to switch between charging by inputting the first DC power and discharging by outputting the second DC power; and
 at least one energy storage battery 502 coupled to the charging/discharging switch device 501. The energy storage battery 502 according to an embodiment of the present application may be arranged in one group. That is, the AC-DC conversion circuit is connected in parallel with the energy storage batteries 502 in one group. Alternatively, a plurality of groups of the energy storage batteries 502 may be provided as required. That is, the AC-DC conversion circuit is connected in parallel with a plurality of groups of the energy storage batteries 502. In an embodiment, the number of the energy storage batteries 502 is not limited herein.

In another embodiment of the present embodiment, the charging/discharging switch device 501 includes a bi-directional DC/DC converter coupled to the first DC bus via a second DC bus to receive the first DC power and/or output the second DC power.

The bi-directional DC/DC converter may be a non-isolated bi-directional DC/DC converter, or may be an isolated bi-directional DC/DC converter.

In the present embodiment, the non-isolated bi-directional DC/DC converter includes a Buck-Boost-type bi-directional DC/DC converter involving a buck-type and a boost-type, a same class bi-directional DC/DC converter formed by a Buck/Boost-type DC/DC converter, and or a non-isolated bi-directional DC/DC converter having other configuration. Similarly, the isolated bi-directional DC/DC converter includes a flyback bi-directional DC/DC converter formed by a single-tube flyback DC converter, a forward bi-directional DC/DC converter formed by a single-tube forward DC converter, or a bidirectional half-bridge and push-pull DC/DC converter formed by a double-tube half-bridge DC/DC converter and a push-pull DC/DC converter, or an isolated bi-directional DC/DC converter having other configuration. All kinds of bi-directional DC/DC conversion structures capable of realizing the functions of the charging/discharging switch device 501 of the present application all fall within the scope of the present application.

In another embodiment of the present embodiment, the charging/discharging switch device 501 further includes two DC/DC converters, that is, the charging/discharging switch device 501 includes a charge DC/DC converter and a discharge DC/DC converter, and each of the charge DC/DC converter and the discharge DC/DC converter is coupled to the first DC bus via a second DC bus. When the energy storage circuit 500 is charged, the charge DC/DC converter may input the first DC power to the energy storage battery 502. When the energy storage circuit 500 is discharged, the discharge DC/DC converter may output the second DC power to the power output terminal 102.

The charge DC/DC converter and the discharge DC/DC converter may have the same type of DC/DC converter or different types of DC/DC converters. The charge DC/DC converter and the discharge DC/DC converter may be the same bi-directional DC/DC converter.

The DC/DC converter may be a non-isolated-type DC/DC converter, or may be an isolated-type DC/DC converter.

In an embodiment, the non-isolated DC/DC converter includes a buck-type DC/DC converter, a boost-type DC/DC converter, and a Buck-Boost-type DC/DC converter, and may further include a non-isolated DC/DC converter having other configuration. Similarly, the isolated bi-directional DC/DC converter includes a flyback DC/DC converter, a forward DC/DC converter, a double-tube half-bridge DC/DC converter, and a push-pull DC/DC converter, and may further include a non-isolated DC/DC converter having other configuration. All kinds of DC/DC conversion structures capable of realizing the functions of the charging/discharging switch device 501 of the present application all fall within the scope of the present application.

In another embodiment of the present application, as shown in FIG. 4, the energy storage circuit 500 further includes a switch device 503 disposed in a connection circuit channel formed by the at least one energy storage battery 502 and the charging/discharging switch device 501, to connect or disconnect the at least one energy storage battery 502 and the charging/discharging switch device 501. The at least one energy storage battery 502 is connected to the charging/discharging switch device 501 via the switch device 503. The switch device 503 in this embodiment may be a single-pole single-throw switch K 1, or may be another switch device capable of implementing the functions of the switch device 503. The switch device 503 is not limited herein in the present application.

In another embodiment of the present application, the energy storage circuit 500 further includes an overcurrent protection device 504. The overcurrent protection device 504 is at one or more nodes (not shown) in the second DC bus for suppressing overcurrent in the first DC power and/or the second DC power.

Specifically, the overcurrent protection device 504 may be a first fuse F1, and the second DC bus is coupled to the first fuse F1. The overcurrent protection device 504 is configured to suppress a short-circuit current or an overload current in the first DC power and/or the second DC power through the first fuse F1. In an embodiment, the overcurrent protection device 504 may further be a resistor, a diode, a circuit breaker, or the like, and may be any other device capable of suppressing a short-circuit current or an overload current in the first DC power and/or the second DC power, which is not limited herein in this embodiment.

In another embodiment of the present application, as shown in FIGS. 3 and 4, the rectifying circuit 200 further includes an input filtering circuit 204, and the power input terminal 101 is coupled to the AC-DC conversion circuit 201 via the input filtering circuit 204 to eliminate electromagnetic interference in the AC power.

In the present embodiment, the input filtering circuit 204 is coupled to the input transformer 300 through three input phase lines (see specifically below), and is coupled to the AC-DC conversion circuit 201 through three output phase lines. Three three-phase AC input terminals of the input transformer 300, i.e., a three-phase AC input terminal R, a three-phase AC input terminal S, and a three-phase AC input terminal T, are coupled to the three input phase lines, respectively. An input phase line coupled to the three-phase AC input terminal R may be set as a first input phase line. An input phase line coupled to the three-phase AC input terminal S may be set as the second input phase line. An input phase line coupled to the three-phase AC input terminal T may be set as the third input phase line.

Specifically, as shown in FIG. 4, the input filtering circuit 204 includes a first capacitor C1, a second capacitor C2, and a third capacitor C3. Each of the first capacitor C1, the second capacitor C2, and the third capacitor C3 includes an X capacitor. Both terminals of the first capacitor C1 are coupled to the first input phase line and the second input phase line, respectively. Both terminals of the second capacitor C2 are coupled to the second input phase line and the third input phase line, respectively. Both terminals of the third capacitor C3 are coupled to the first input phase line and the third input phase line, respectively.

The input filtering circuit 204 further includes a first inductor L1, a second inductor L2, and a third inductor L3. The first inductor L1, the second inductor L2, and the third inductor L3 is coupled to the first input phase line, the second input phase line, and the third input phase line, respectively.

In the application process, the AC power respectively input from the three-phase AC input terminal R, the three-phase AC input terminal S, and the three-phase AC input terminal T is filtered by the first capacitor C1, the second capacitor C2, the third capacitor C3, the first inductor L1, the second inductor L2, and/or the third inductor L3, so as to filter out unexpected interference signals in the AC power.

The input filtering circuit 204 further includes second fuses F2 coupled to the three input phase lines, respectively, to suppress a short-circuit current or an overload current in the AC power.

In another embodiment of the present application, as shown in FIGS. 3 and 4, the rectifying circuit 200 further includes an output filtering circuit 205, and the DC-DC conversion circuit 202 is coupled to the power output terminal 102 via the output filtering circuit 205 to eliminate electromagnetic interference in the DC power transmitted towards the power output terminal 102.

Specifically, the output filtering circuit 205 includes a fifth inductor L5 and a fifth capacitor C5. One terminal of the fifth inductor L5 is coupled to the negative electrode of the first diode D1, the other terminal of the fifth inductor L5 is coupled to one terminal of the fifth capacitor C5, and the other terminal of the fifth capacitor C5 is coupled to the second output node Y2 of the AC-DC conversion circuit 201. In an embodiment, the fifth inductor L5 and the fifth capacitor C5 may form a filter, and the DC power transmitted to the power output terminal 102 is filtered by the filter formed by the fifth inductor L5 and the fifth capacitor C5, so as to filter out unexpected interference signals in the DC power.

In another embodiment of the present application, as shown in FIGS. 3 and 4, the rectifying circuit 200 further includes an anti-backflow circuit 206, and the output filtering circuit 205 is coupled to the power output terminal 102 via the anti-backflow circuit 206 to prevent the DC power output from the power output terminal 102 from being back flowed into the power supply system.

The anti-backflow circuit 206 includes a second diode D2. A positive electrode of the second diode D2 is coupled to a coupling point where the fifth inductor L5 meets the fifth capacitor C5. A negative electrode of the second diode D2 is coupled to one of the output DC buses of the power output terminal 102. The second diode D2 may include an anti-reverse diode and may prevent the electric signal of the power output terminal 102 from being back flowed into the power supply system, to make the power supply system more secure. The anti-backflow circuit 206 in an embodiment may include another device capable of realizing the same function, which is not limited herein in the present application.

In another embodiment of the present application, as shown in FIGS. 3 and 4, the power supply system further includes an input transformer 300, and the power input terminal 101 is coupled to the rectifying circuit 200 via the input transformer 300. The input transformer 300 is configured to convert the AC power into AC power having a predetermined voltage value and output the AC power having the predetermined voltage value to the rectifying circuit 200.

Specifically, the input transformer 300 may configure the three-phase AC power input from the power input terminal 101 as a plurality of channels of three-phase AC power having a predetermined voltage value, and input the three-phase AC power in each channel to the corresponding rectifying circuit 200.

In an embodiment, the power supply system further includes:
- a circuit breaker QF1 coupled to the power input terminal 101 to disconnect or connect the input transformer 300 and the three-phase AC power.

In an embodiment, the power supply system may include a plurality of sets of rectifying circuits 200. Each set of rectifying circuits 200 is separated from each other. The input transformer 300 may include a plurality of columns of a phase-shifting transformer. Each of the output columns of the phase-shifting transformer is connected to the plurality of sets of rectifying circuits 200 separated from each other, so that the three-phase AC power input from the power input terminal 101 is configured as a plurality of channels of three-phase AC power input to the plurality of sets of rectifying circuits 200, respectively. The phase-shifting transformer in the present embodiment may greatly reduce a short-circuit current of a secondary column of the input transformer 300. In addition, the input transformer 300 may be a conventional transformer, which is not limited herein.

In another embodiment of the present application, as shown in FIGS. 3 and 4, the power supply system further includes an output power distribution circuit 400, and the rectifying circuit 200 is coupled to the power output terminal 102 via the output power distribution circuit 400. The output power distribution circuit 400 is configured to distribute the DC power output from the rectifying circuit 200 to respective power-consuming branches.

The power supply system may supply power to one or more loads at the same time, and the output power distribution circuit 400 may include power-consuming branches respectively coupled to the plurality of loads, and may further include components (not shown) such as a fuse and an anti-surge device coupled to the output circuit. The number and capacity of the power-consuming branches may be adjusted according to actual conditions, which are not limited herein. That is, the output power distribution circuit 400 may configure corresponding DC power for different loads through the output power distribution circuit 400 according to different types of the load, and then output the DC power to the corresponding loads through the power output terminal 102 to supply power.

In an embodiment of the present application, the present application provides a power supply method applied to a power supply system as described above. The power supply method includes:
- upon the AC power is input to the power input terminal 101, the AC-DC conversion circuit 201 converts the AC power into first DC power and transmits the first DC power to the energy storage circuit 500 so that the energy storage circuit 500 is charged;
- upon the AC power input to the power input terminal 101 is stopped, the energy storage circuit 500 is discharged and configured to output second DC power to the DC-DC conversion circuit 202.

The principles and implementations of the present application are described above by some embodiments. The description of the embodiments is merely provided to help understand the present application. Variations will occur to those skilled in the art based on the teachings of the present application. Thus, the presented description should not be construed as limiting the present application.

What is claimed is:

1. A power supply system comprising a power input terminal, a rectifying circuit, and a power output terminal coupled in sequence,
    wherein the rectifying circuit comprises an AC-DC conversion circuit and a DC-DC conversion circuit coupled to the AC-DC conversion circuit via a first DC bus, wherein the power input terminal is connected to the power output terminal via the AC-DC conversion circuit, the first DC bus, and the DC-DC conversion circuit in sequence;
    the power supply system further comprises at least one energy storage circuit coupled to the first DC bus;
    the AC-DC conversion circuit is configured to, when AC power is input to the power input terminal, convert the AC power into first DC power, input the first DC power to the energy storage circuit for charging the energy storage circuit, and transmit the first DC power to the power output terminal via the first DC bus and the DC-DC conversion circuit in sequence; and
    the energy storage circuit is configured to, when the AC power fails to be input to the power input terminal, discharge by outputting second DC power to the power output terminal via the DC-DC conversion circuit.

2. The power supply system of claim 1, wherein the energy storage circuit comprises a charging/discharging switch device and at least one energy storage battery coupled to the charging/discharging switch device; and
    wherein the charging/discharging switch device is coupled to the first DC bus via a second DC bus to switch between charging by inputting the first DC power and discharging by outputting the second DC power.

3. The power supply system of claim 2, wherein the energy storage circuit further comprises a switch device electrically connected between the energy storage battery and the charging/discharging switch device to connect/disconnect the energy storage battery with the charging/discharging switch device.

4. The power supply system of claim 2, wherein the energy storage circuit further comprises two overcurrent protection devices respectively disposed in the two second DC buses to suppress overload current in at least one of the first DC power or the second DC power.

5. The power supply system of claim 1, wherein the rectifying circuit further comprises an input filtering circuit coupled between the power input terminal and the AC-DC conversion circuit to eliminate electromagnetic interference in the AC power input to the power input terminal.

6. The power supply system of claim 5, wherein the rectifying circuit further comprises an output filtering circuit coupled between the DC-DC conversion circuit and the power output terminal to eliminate electromagnetic interference in DC power output to the power output terminal.

7. The power supply system of claim 6, wherein the rectifying circuit further comprises an anti-backflow circuit coupled between the output filtering circuit and the power output terminal to prevent the DC power output to the power output terminal from flowing back into the output filtering circuit.

8. The power supply system of claim 1, further comprising an input transformer coupled between the power input terminal and the rectifying circuit to convert the AC power input to the power input terminal into target AC power having a predetermined voltage value and output the target AC power to the rectifying circuit.

9. The power supply system of claim 1, further comprising an output power distribution circuit coupled between the rectifying circuit and the power output terminal to distribute DC power output from the rectifying circuit to each power-consuming branch.

10. A power supply method applied to a power supply system comprising a power input terminal, a rectifying circuit, and a power output terminal coupled in sequence,
wherein the rectifying circuit comprises an AC-DC conversion circuit and a DC-DC conversion circuit coupled to the AC-DC conversion circuit via a first DC bus, wherein the power input terminal is connected to the power output terminal via the AC-DC conversion circuit, the first DC bus, and the DC-DC conversion circuit in sequence; and
wherein the power supply system further comprises at least one energy storage circuit coupled to the first DC bus,
wherein the power supply method comprises one of:
when AC power is input to the power input terminal, the AC-DC conversion circuit converting the AC power into first DC power, inputting the first DC power to the energy storage circuit for charging the energy storage circuit, and transmitting the first DC power to the power output terminal via the first DC bus and the DC-DC conversion circuit in sequence; and
when the AC power fails to be input to the power input terminal, the energy storage circuit discharging by outputting second DC power to the power output terminal via the DC-DC conversion circuit.

11. The power supply method of claim 10, wherein the energy storage circuit comprises a charging/discharging switch device and at least one energy storage battery coupled to the charging/discharging switch device; and
wherein the charging/discharging switch device is coupled to the first DC bus via a second DC bus to switch between charging by inputting the first DC power and discharging by outputting the second DC power.

12. The power supply method of claim 11, wherein the energy storage circuit further comprises a switch device electrically connected between the energy storage battery and the charging/discharging switch device to connect/disconnect the energy storage battery with the charging/discharging switch device.

13. The power supply method of claim 11, wherein the energy storage circuit further comprises two overcurrent protection devices respectively disposed in the two second DC buses to suppress overload current in at least one of the first DC power or the second DC power.

14. The power supply method of claim 10, wherein the rectifying circuit further comprises an input filtering circuit coupled between the power input terminal and the AC-DC conversion circuit to eliminate electromagnetic interference in the AC power input to the power input terminal.

15. The power supply method of claim 14, wherein the rectifying circuit further comprises an output filtering circuit coupled between the DC-DC conversion circuit and the power output terminal to eliminate electromagnetic interference in DC power output to the power output terminal.

16. The power supply method of claim 15, wherein the rectifying circuit further comprises an anti-backflow circuit coupled between the output filtering circuit and the power output terminal to prevent the DC power output to the power output terminal from flowing back into the output filtering circuit.

17. The power supply method of claim 10, wherein the power supply system further comprises an input transformer coupled between the power input terminal and the rectifying circuit to convert the AC power input to the power input terminal into target AC power having a predetermined voltage value and output the target AC power to the rectifying circuit.

18. The power supply method of claim 10, wherein the power supply system further comprises an output power distribution circuit coupled between the rectifying circuit and the power output terminal to distribute DC power output from the rectifying circuit to each power-consuming branch.

* * * * *